US009484642B2

(12) United States Patent
Okuno et al.

(10) Patent No.: US 9,484,642 B2
(45) Date of Patent: *Nov. 1, 2016

(54) TERMINAL, A WIRE CONNECTING STRUCTURE AND A METHOD OF MANUFACTURING THE TERMINAL (71) Applicants: Furukawa Electric Co., Ltd., Tokyo (JP); Furukawa Automotive Systems Inc., Shiga (JP)

(72) Inventors: Yoshikazu Okuno, Tokyo (JP); Akira Tachibana, Tokyo (JP); Kengo Mitose, Tokyo (JP)

(73) Assignees: FURUKAWA ELECTRIC CO., LTD., Tokyo (JP); FURUKAWA AUTOMOTIVE SYSTEMS INC., Shiga (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/831,643

(22) Filed: Aug. 20, 2015

(65) Prior Publication Data

US 2015/0357724 A1  Dec. 10, 2015

Related U.S. Application Data (63) Continuation of application No. PCT/JP2014/050172, filed on Jan. 8, 2014.

(30) Foreign Application Priority Data

Feb. 22, 2013  (JP) .................. 2013-033914

(51) Int. Cl.
H01R 4/10  (2006.01)
H01R 4/18  (2006.01)
(Continued)

(52) U.S. Cl.
CPC ............. *H01R 4/187* (2013.01); *B23K 26/20* (2013.01); *C25D 7/00* (2013.01); *H01R 13/03* (2013.01);
(Continued)

(58) Field of Classification Search
CPC .......... H01R 4/185; H01R 4/20; H01R 4/62; Y10T 428/12493; Y10T 428/31678; Y10T 428/12903; Y10T 29/49185; Y10T 29/5193; Y10T 29/49179
See application file for complete search history.

(56) References Cited

U.S. PATENT DOCUMENTS 5,129,143 A * 7/1992 Wei ........................ C25D 5/10
29/885
5,307,562 A * 5/1994 Denlinger .............. H01R 13/03
29/882

(Continued)

FOREIGN PATENT DOCUMENTS

JP  2003-191085 A  7/2003
JP  2004-71437 A   3/2004

(Continued)

OTHER PUBLICATIONS

English translation of Written Opinion for PCT/JP2014/050172 dated Apr. 15, 2014.

(Continued)

Primary Examiner — Xuong Chung Trans
(74) Attorney, Agent, or Firm — Thompson Coburn LLP (57) ABSTRACT A terminal includes a connector portion, a tubular crimp portion that crimps/joins with a wire, and a transition portion joining the two portions. The tubular crimp portion is composed of a metal member including a base material of copper or copper alloy with 0.20-1.40 mm thickness and a coating layer of tin, tin alloy, nickel, nickel alloy, silver or silver alloy with 0.2-3.0 μm thickness formed on the base material. The tubular crimp portion has a weld portion formed by butt-welding and having, in its cross-section perpendicular to a terminal longitudinal direction, a phase existing therein of tin, tin alloy, nickel, nickel alloy, silver or silver alloy greater than 0.01 μm². The tubular crimp portion is a closed tubular body with one end opposite to a wire-insertion-opening being closed.

8 Claims, 4 Drawing Sheets (51) Int. Cl.
*H01R 43/16* (2006.01)
*C25D 7/00* (2006.01)
*H01R 13/03* (2006.01)
*H01R 43/02* (2006.01)
*B23K 26/20* (2014.01)
*H01R 4/20* (2006.01)
*H01R 4/62* (2006.01)
*C25D 3/12* (2006.01)
*C25D 3/30* (2006.01)

(52) U.S. Cl.
CPC .......... *H01R 43/0221* (2013.01); *H01R 43/16* (2013.01); *B23K 2201/38* (2013.01); *C25D 3/12* (2013.01); *C25D 3/30* (2013.01); *H01R 4/20* (2013.01); *H01R 4/62* (2013.01); *Y10T 29/49215* (2015.01)

(56) References Cited

U.S. PATENT DOCUMENTS

| | | | | |
|---|---|---|---|---|
| 7,294,028 B2* | 11/2007 | Rehbein | ................... | H01H 1/02 428/614 |
| 8,403,714 B2* | 3/2013 | Nakata | ................... | H01R 13/03 439/877 |
| 8,496,504 B2* | 7/2013 | Ono | ....................... | H01R 4/185 439/877 |
| 2010/0186993 A1 | 7/2010 | Yamaguchi et al. | | |
| 2012/0325552 A1 | 12/2012 | Sakura | | |
| 2015/0357723 A1* | 12/2015 | Tachibana | ................ | C25D 7/00 439/878 |

FOREIGN PATENT DOCUMENTS

| | | |
|---|---|---|
| JP | 2004-199934 A | 7/2004 |
| JP | 2004-207172 A | 7/2004 |
| JP | 4598039 B | 10/2010 |
| JP | 2010-280955 A | 12/2010 |
| JP | 2011-222243 A | 4/2011 |
| JP | 2012-69449 A | 4/2012 |
| WO | 2008/123259 A1 | 10/2008 |
| WO | 2010/119489 A1 | 10/2010 |

OTHER PUBLICATIONS

English translation of International Preliminary Report on Patentability (Chapter I) for PCT/JP2014/050172 dated Aug. 25, 2015.
International Search Report and Written Opinion dated Apr. 15, 2014 for PCT/JP2014/050172.
Decision to Grant a Patent issued on Apr. 14, 2014 in corresponding Japanese Patent Application No. 2014-508209.
Office Action issued on Jan. 2, 2015 in corresponding Korean Patent Application No. 10-2014-7022544.
Notice of Allowance received on Mar. 30, 2015 in corresponding Korean Patent Application No. 10-2014-7022544.

* cited by examiner

F I G. 1

F I G. 3

F I G. 2 A

F I G. 2 B

F I G. 2 C

F I G. 2 D

F I G. 4

F I G. 5

F I G. 6

TERMINAL, A WIRE CONNECTING STRUCTURE AND A METHOD OF MANUFACTURING THE TERMINAL

CROSS REFERENCE TO RELATED APPLICATIONS

This is a continuation application of International Patent Application No. PCT/JP2014/050172 filed Jan. 8, 2014, which claims the benefit of Japanese Patent Application No. 2013-033914, filed Feb. 22, 2013. This application is entitled to participation in the patent prosecution highway program because of corresponding Japanese Patent Application No. 2014-508209, which claims the benefit of International Patent Application No. PCT/JP2014/050172 filed Jan. 8, 2014, which claims the benefit of Japanese Patent Application No. 2013-033914, filed Feb. 22, 2013, the full contents of all of which are hereby incorporated by reference in their entirety.

BACKGROUND

1. Technical Field

The present disclosure relates to a component that provide electric conduction. More specifically, a terminal that connects electric wires, a method of manufacturing thereof, and a wire connecting structure that joins a terminal and an electric wire.

2. Background

In the related art, a connection between an electric wire and a terminal in an automotive wire harness or the like is generally a crimp connection in which an electric wire is crimped with a terminal which is referred to an open barrel type. However, with an open barrel type terminal, when moisture or the like comes into contact with a connecting part (contact point) between the electric wire and the terminal, oxidation of a metal surface of the electric wire and/or the terminal progresses, and an electric resistance at a connecting part will increase. When metals used for the electric wire and the terminal are different from each other, galvanic corrosion progresses. Progression of metal oxidation and corrosion at the connecting part causes a crack and a poor contact at the connecting part, and an influence on a product life cannot be avoided. Particularly, in recent years, wire harnesses having an electric wire made of an aluminum alloy and a terminal base material made of a copper alloy are put to practical use, and thus problems of oxidation and corrosion of the connection part are becoming more prominent.

In order to prevent corrosion of an aluminum wire at the connecting part, Japanese Laid-Open Patent Publication No. JP 2004-199934 discloses that the terminal is made of an aluminum alloy of the same material type as that of a wire conductor to suppress galvanic corrosion which occurs in the case of a copper terminal of the related art. However, in a case where an aluminum alloy is used for the terminal, strength and spring characteristics of the terminal per se are not sufficient. Further, in order to compensate for the above, a structure incorporating a spring made of an iron-based material in the terminal is employed, and thus there is a problem of galvanic corrosion between a spring member and a terminal base material (aluminum) and a problem of an increased production cost due to time and efforts required for assembling.

Japanese Patent No. 4598039 discloses a configuration in which, in order to protect a connection part between the electric wire and the terminal, a copper cap is attached to a portion of an aluminum wire where a conductor is exposed. However, there is a problem of an increased volume of a crimp portion due to an existence of the cap and a problem of a bad crimp connection and an increased production cost due to an increase in number of parts.

Further, in Japanese Laid-Open Patent Publication 2011-222243, a method of molding an entire crimp connection portion with a resin is employed, and there is a problem of an increased size of a connector housing due to an enlarged mold portion, which makes it difficult to make the entire wire harness with a high-density and miniaturized structure, and a problem that a process of manufacturing a wire harness and an operation thereof become more complicated. Japanese Laid-Open Patent Publication 2004-207172 discloses employing a method in which, in order to shield an aluminum conductor from outside, a metal cap is provided to cover the wire conductor and thereafter a crimp piece of the terminal metal fitting is further crimped. However, there is a problem that a process of attaching the aforementioned metal cap to each conductor before crimping the crimp piece of the terminal metal fitting is cumbersome and a problem of an immersion due to breakage of the metal cap by a wire barrel during crimping.

The aforementioned problem can be solved by employing a structure of a connecting portion to an electric wire in which an electric wire is inserted in to a tubular (bag-like) terminal and crimped to thereby shield an electric wire from outside without increasing the size of a crimp portion. Among several methods of forming a tube, it is preferable to employ a laser welding method (e.g., see Japanese Laid-Open Patent Publication 2003-191085) from the processing speed and the cost points of view, in addition to the point that the width of the weld portion can narrowed.

However, when the YAG laser welding method disclosed in patent document 5 is used, although a collecting beam diameter of a YAG laser is smaller than that of other welding methods, it is still considerably large from a practical point of view and the width of the weld portion becomes large. Therefore, when welded by YAG laser welding, there is a drawback that a molten portion is likely to fall, and, as a result, a wall thickness of the weld portion decreases.

In a terminal in which a tubular crimp portion is formed by using a copper alloy plate (metal member) having a coating layer such as a tin layer on its surface and by laser welding it, if a considerable amount of solid solution of Sn is produced in the weld portion, the strength of the weld portion becomes too high. When an electric wire is inserted into such a tubular crimp portion and crimped, the weld portion might break.

The present disclosure is contrived in view of the aforementioned drawbacks and it is an object of the present disclosure to provide a terminal having a weld portion that is preferably formed in a tubular crimp portion by laser welding. That is, a decrease in a strength and a decrease in a thickness of the weld portion are suppressed and cracking during the crimping process is suppressed. Also, it is an object of the present disclosure is to provide a wire connecting structure that includes such a terminal.

SUMMARY

Aspects of the disclosure of the present application are described below.

A terminal including a connector portion adapted to mate with another terminal, a tubular crimp portion adapted to crimp and join with an electric wire, a transition portion that joins the connector portion and the tubular crimp portion, the tubular crimp portion being composed of a metal member including a base material and a coating layer formed on the base material, the base material being composed of copper or a copper alloy and having a thickness of 0.20 mm to 1.40 mm, the coating layer being composed of one of tin, a tin alloy, nickel, a nickel alloy, silver and a silver alloy and having a thickness of 0.2 µm to 3.0 µm, the tubular crimp portion having a weld portion formed by butt welding the metal member, the weld portion having, in a cross section of the weld portion perpendicular to a longitudinal direction of the terminal, a phase existing therein of one of tin, a tin alloy, nickel, a nickel alloy, silver and a silver alloy that is greater than 0.01 µm$^2$, the tubular crimp portion being formed into a closed tubular body in which one end opposite to an electric wire insertion opening is closed.

A method of manufacturing a terminal, including punching a plate material to form a cut-out member, the plate material being composed of a metal member including a base material and a coating layer formed on the base material, the base material being composed of one of copper and a copper alloy and having a thickness in a range of 0.2 mm to 0.7 mm, the coating layer being composed of one of tin, a tin alloy, nickel, a nickel alloy, silver and a silver alloy and having a thickness in a range of 0.2 µm to 3.0 µm, performing a pressing process on the cut-out member to form a tubular body, welding a butted portion of the tubular body, and forming a closed end portion by welding lapped portion of the tubular body at an end opposite to an insertion opening portion of the tubular body.

According to the above-described disclosures, a weld portion can be provided in a preferred manner in a tubular crimp portion of a terminal by laser welding. Further, a terminal can be provided in which a decrease in strength and a decrease in a thickness of the weld portion are suppressed and cracking during the crimping process is suppressed.

DETAILED DESCRIPTION

Hereinafter, an embodiment of the present disclosure (hereinafter, referred to as an embodiment) will be described in detail below with reference to the accompanying drawings.

(Metal Member)

A terminal of the present disclosure is composed of a metal member. Note that since a connector portion of the terminal and a tubular crimp portion may be formed separately and thereafter joined at a transition portion, it is necessary to form at least the tubular crimp portion with a metal member according to the present disclosure. The metal member according to the present disclosure includes a base material, an under layer that is arbitrary provided on the base material, and a coating layer that is provided on the base material or the under layer.

(Base Material)

The base material 2 is composed of copper (e.g., tough pitch copper or oxygen free copper) or a copper alloy, and is preferably composed a copper alloy. Examples of the copper alloy used for the terminal include, for example, brass (e.g., C2600, C2680 of CDA (Copper Development Association)), phosphor bronze (e.g., C5210 of CDA), a Corson copper alloy (Cu—Ni—Si—(Sn, Zn, Mg, Cr) copper alloy). Among those, a Corson copper alloy is preferable from an overall point of view including intensity, conductivity, and cost. Examples of the Corson copper alloy may be, but not limited to, for example, copper alloys FAS-680 and FAS-820 (product names, respectively) manufactured by Furukawa Electric Co., Ltd., copper alloys MAX-375 and MAX251 (product names, respectively) manufactured by Mitsubishi Shindoh Co., Ltd. Further, C7025 or the like of CDA can be used.

Further, examples of other copper alloy compositions include, for example, a Cu—Sn—Cr copper alloy, a Cu—Sn—Zn—Cr copper alloy, a Cu—Sn—P copper alloy, a Cu—Sn—P—Ni copper alloy, a Cu—Fe—Sn—P copper alloy, a Cu—Mg—P copper alloy, and a Cu—Fe—Zn—P copper alloy. Incidental impurities other than essential elements described above may of course be included.

The base material requires a certain strength and also requires workability for punching and pressing. Therefore, the base material has a thickness of 0.20 mm to 1.40 mm. It is desirably thinner for a small component, and 0.20 mm to 0.70 mm is more preferable.

(Under Layer)

An under layer is a layer that is arbitrarily provided on a part or an entirety of a surface of the base material. That is, it is arbitrarily provided between the base material and a coating layer to be described below. Mainly, it is provided for improving adhesiveness between the base material and the coating layer and for preventing the spreading of components of the two. The under layer has a thickness of less than or equal to 0.8 µm. When the thickness of the under layer exceeds 0.8 µm, the aforementioned effect is saturated, and workability at the time of the processing is likely to worsen. The thickness of the under layer of greater than or equal to 0.1 µm is preferable from the viewpoint of prevention of the spreading. The under layer is composed of one of the metals that are nickel, a nickel alloy, cobalt, and a cobalt alloy. Here, a nickel alloy refers to an alloy that has nickel as its major component (with a mass ratio of greater than 50%). A cobalt alloy refers to an alloy that has cobalt as its major component (a mass ratio of greater than 50%).

(Coating Layer)

A coating layer is a layer provided on the under layer and/or the base material. A case in which the coating layer is provided on the under layer and the base material is, for example, a case in which the under layer is provided only on a part of the base material and the coating layer is coating the under layer and the base material. The coating layer may also be provided on a part or an entirety of the under layer and/or the base material. The coating layer is composed of tin or a tin alloy. The tin alloy refers to the one containing tin as a major component (a mass ratio of greater than or equal to 50%). Note that the coating layer of the present disclosure may be composed of nickel, a nickel alloy, silver or a silver alloy.

The coating layer has a thickness of 0.2 µm to 3.0 µm, and more preferably, 0.3 µm to 2.0 µm. The thickness of the coating layer is measured by a fluorescent X-ray film thickness meter. By making the thickness of the coating layer into a predetermined range, it is possible to adjust an amount of the metal component forming the coating layer that melts into the weld portion. That is, an appropriate weld portion can be obtained. When an average value of the thickness of the coating layer in the tubular crimp portion described below is d1 (μm), and an average value of the thickness of the base material is d2 (μm), d1/d2 is preferably 0.001 to 0.005. By bringing the ratio of the two into a predetermined range, an amount of component of the coating layer that melts into the weld portion can be adjusted. That is, an appropriate formation of a phase in the weld portion composed of the component of the coating layer (a phase of tin, a tin alloy, nickel, a nickel alloy, silver or a silver alloy) contributes in prevention of cracks in the weld portion and improvement in weldability.

The arithmetic mean roughness Ra of a surface of the coating layer is preferably greater than or equal to 0.5 μm, and more preferably 0.6 μm to 1.2 μm. With the surface arithmetic mean roughness Ra being adjusted, an improved absorptivity of laser light is obtained in performing the laser welding. Thus, laser weldability can be improved and it becomes easy to perform a good welding. As a result, after the welding, occurrence of blowholes can be suppressed and a width of HAZ (Heat Affected Zone) can be reduced.

A method of forming such a coating layer is not particularly limited, and, for example, various kinds of film formation techniques such as an electroplating process of tin, nickel and silver, as well as electroless plating, hot dipping, vapor deposition, ion plating, sputtering, chemical vapor deposition, or the like may be employed. Among those, from the viewpoint of operability or cost, it is preferable to provide the coating layer by applying a plating process.

Since a white metal such as tin, nickel or silver has a higher laser light absorptivity (lower laser light reflectance) in a wavelength region of a laser light than that of copper or a copper alloy, providing the coating layer on the base material results in improved laser weldability. Action thereof can be considered as follows by taking tin as an example. First, tin constituting the coating layer melts due to energy of laser light. Then, heat energy propagates from molten tin, and a metal composing the under layer and copper or the copper alloy composing the base material directly underneath melts. After the laser irradiation, the molten copper or the like solidifies together with tin, and the joining completes. Tin composing the coating layer melts after the laser welding by laser irradiation, and is taken into copper or a copper alloy composing the base material at the weld portion (reference numeral 50 in FIG. 1 described later). This is a state where tin that existed as a coating layer before the welding have been taken into a solidification structure due to the welding and exists as a solid solution in a copper parent phase, and/or, a state of being crystallized in/out the copper parent phase as a copper-tin intermetallic compound. Note that tin may attach to an outer side of the weld portion, and in such a case, a part of tin is not taken into the base material and remains on the surface of the base material after the welding.

Hereinafter, layer formation of the coating layer by electroplating will be described. In order to form the coating layer on a surface, it is preferable that the settings of the plating conditions is set such that a current density is set at a high current density in such a range that a gray coating is not produced to roughen a surface. The current density is, although it may depend on the plating bath condition, for example, in the case of a Sn plating bath according to the present example, 5 A/dm$^2$ to 10 A/dm$^2$, and, in the case of a Ni plating bath, 20 A/dm$^2$ to 30 A/dm$^2$. Also, a higher current density can be achieved by increasing an activity. As an example, a rate of stirring of the plating bath may be increased. In an experiment in a laboratory, it is preferable that the current density and the stirring condition are adjusted at the same time concerning the devices.

(Terminal)

Figure 1:
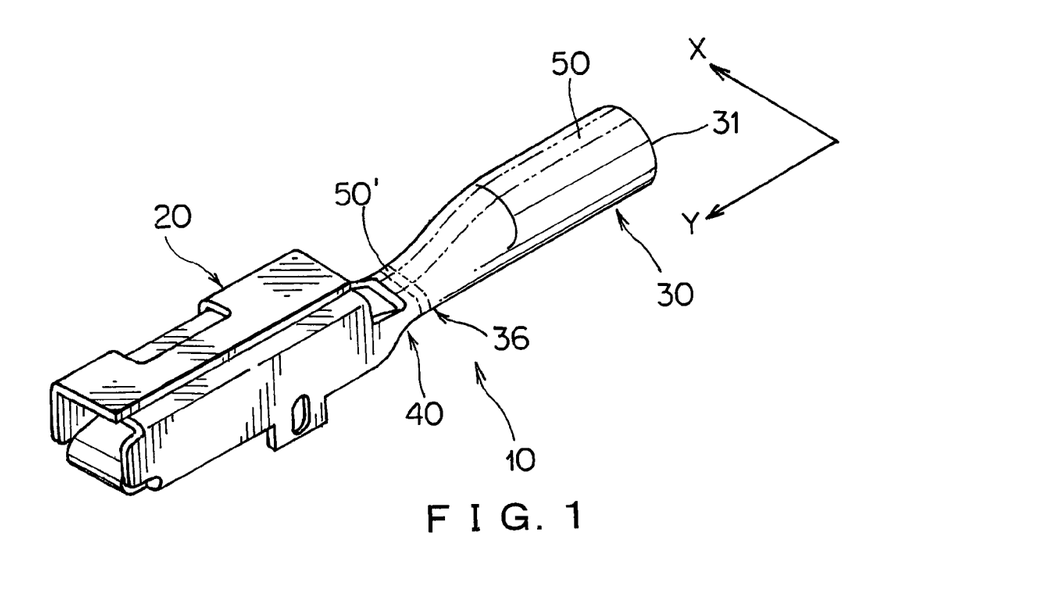
FIG. 1 is a perspective view showing an example of a terminal of the present disclosure.

FIG. 1 is a diagram showing an example of a terminal of the present disclosure. The terminal 10 has a connector portion 20 of a female terminal, a tubular crimp portion 30 that, after an electric wire has been inserted therein, connects the electric wire and the terminal 10 by being crimped, and a transition portion 40 that links the connector portion 20 and the tubular crimp portion 30. Further, the terminal 10 has weld portions 50, 50' (regions indicated with broken lines in the figure) in the tubular crimp portion 30. The terminal 10 is formed from a flat plate material of the metal member.

The connector portion 20 is a box portion that allows insertion of an insertion tab such as a male terminal. In the present disclosure, the shape of the details of the connector portion 20 is not particularly limited. That is, in other embodiments of the terminal of the present disclosure, it does not need to be a box portion, and, for example, may be an insertion tab of a male terminal instead of the box portion. Also, it may be an end portion of the terminal according to other embodiments. Herein, an example of a female terminal is shown for the sake of convenience of describing the terminal of the present disclosure. As long as the terminal has the tubular crimp portion 30 provided via the transition portion 40, the terminal may have any kind of connecting end portion.

The transition portion 40 is a portion that bridges between the connector portion 10 and the tubular crimp portion 30. It can be formed three-dimensionally or formed in a planar manner. Considering a mechanical strength against folding in a longitudinal direction of the terminal, it should be designed in such a manner that a second moment of area in a longitudinal direction increases.

The tubular crimp portion 30 is a portion at which the terminal 10 and an electric wire (not shown) are crimped and joined. One end of the tubular crimp portion 30 is an insertion opening portion 31 in which an electric wire can be inserted, and the other end thereof is connected to the transition portion 40. The tubular crimp portion 30 is a closed tubular body with its transition portion 40 side being sealed with a sealing portion 36. That is, the tubular crimp portion 30 is a tubular body that is closed except for the insertion opening portion 31. With the sealing portion 36, moisture or the like is prevented from entering from the transition portion 40 side. An inner diameter of a tube of the tubular crimp portion 30 reduces continuously or step-wise from the insertion opening portion 31 to the sealing portion 36. Since the tubular crimp portion 30 is only required to be a tubular body, a cross section perpendicular to its longitudinal direction is not necessarily circular, and may be an oval, a rectangle, or other shape as the case may be.

At the tubular crimp portion 30, the metal member constituting the tubular crimp portion and an electric wire are electrically and mechanically crimped and joined. Particularly, the electrical joining is performed by strongly pressing (crimping) the metal member and an electric wire conductor. Further, since a part of an insulating coating portion of the electric wire is also crimped at the same time, the tubular crimp portion 30 tightly attaches the insulating coating portion of the electric wire. Particularly, at the insertion opening portion 31, it is preferable to tightly attach without gap so that moisture does not enter from between the metal member of the tubular crimp portion 30 and the electric wire coating portion.

The tube of tubular crimp portion 30 may be provided with electric wire engaging grooves (not shown) at an inner side thereof. When aluminum or an aluminum alloy is used as the conductor of the electric wire, its surface is covered with an oxide film. Thus, by providing such grooves, a contact pressure can be increased with elevated portions between the grooves and reliability of mechanical-electrical connection improves.

The tubular crimp portion 30 is formed by processing a flat plate material of the metal member. More specifically, the plate material of the metal member is punched into a spread-out shapes of the terminals and pressed into three-dimensional shape to form the tubular body having a generally C-shaped cross-section. Then, an open portion of the tubular body (butted portion) is welded. Since the welding is performed along a longitudinal direction of the tubular body, the tubular crimp portion is formed while the weld portion 50 is being formed in a direction which is generally the same as the longitudinal direction. Further, after the welding to form the tubular crimp portion, the end portion of the tubular crimp portion of the transition portion side is welded in a width direction and a sealing portion 36 is provided by forming a weld portion 50'. The sealing portion 36 seals by, squeezing and overlapping the two opposed tube walls (usually upper and lower tube walls) of the tubular crimp portion 30, and welding the lapped portion from the above.

Here, the weld portions 50 and 50' are formed by welding a portion where the coating layer is provided in the terminal of the present disclosure. The coating layer that existed in a region irradiated and dissolved with the welding laser light have disappeared from the surface after the welding. On the other hand, the coating layer that existed in a region where a welding laser light was not irradiated and dissolved remains. For example, tin, nickel, silver or the like that were composing the disappeared coating layer are melted and taken into the laser weld portion 50, and may be taken in to the heat-affected zone, or may be dispersed. Although it cannot be described in general, the dispersed state of tin and nickel may be, depending on the conditions of the laser welding, such a state that they are taken into a solidified structure and exist as a solid solution in a copper parent phase and/or a state that they are crystallized as an intermetallic compound of copper and tin and an intermetallic compound of copper and nickel.

Note that as will be described below, the weld portion 50 is a weld portion at which welding was performed with end surfaces of the metal member being butted with each other and the weld portion which 50' is a weld portion at which welding was performed with the metal member being lapped. In the terminal of the present disclosure, a phase of tin, a tin alloy, nickel or a nickel alloy greater than a size of 0.01 $\mu m^2$ (0.1 $\mu m \times 0.1$ $\mu m$) is observed in arbitrary transverse cross section of the weld portion 50. With such terminal, crimping is performed with an electric wire being inserted in the tubular crimp portion 30, cracks are less likely to occur in the weld portion 50. Also, since there is a phase of tin, a tin alloy, nickel, a nickel alloy, silver or a silver alloy, when the metal which has dissolved at the time of welding solidifies and contracts, a weld defect (blowhole and ingot piping) is less likely to occur, and good welding is enabled.

The phase of tin, a tin alloy, nickel, a nickel alloy, silver or a silver alloy in the weld portion 50 is formed by the metal composing the coating layer melting into the weld portion. For example, when butt welding a copper alloy base material using tin in the coating layer, firstly, tin dissolves by laser irradiation, and then the copper alloy composing the base material dissolves. Then, the two metals mixes and becomes a liquid alloy and then cools rapidly. At this time, although a part of tin is taken into a parent phase of copper alloy as a solid solution, in a case of oversaturation or in a case where a cooling rate is rapid, it remains as a tin phase (tin alloy phase). Various aspects of the tin phase appear depending on a welding condition, and as for the terminal of the present disclosure, a terminal that can achieve a desired effect can be obtained when a phrase greater than the size of 0.01 $\mu m^2$ (0.1 $\mu m \times 0.1$ $\mu m$) exists in an arbitrary transverse cross section of the weld portion 50.

(Method of Manufacturing a Terminal)

FIGS. 2A to 2D are plan views for explaining an example of a method of manufacturing the terminal of FIG. 1. Note that FIGS. 2A to 2D are diagrams of how a terminal is made from a plate material 70 of the metal member viewed in a Z-direction (a direction perpendicular to a plate surface) of the plate material 70.

Figure 2A:
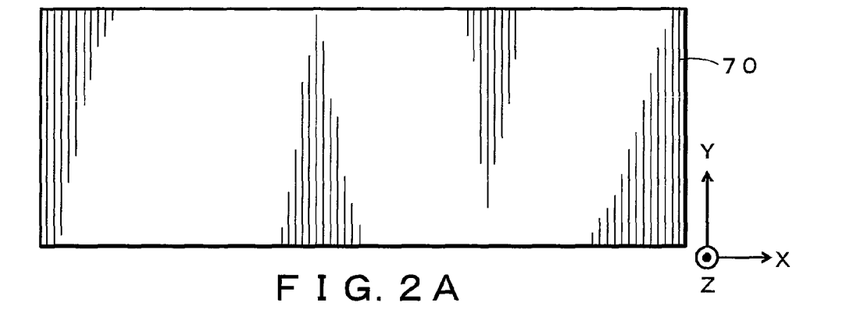
FIGS. 2A to 2D are plan views for explaining a manufacturing method of the terminal of FIG. 1.

Firstly, the plate material 70 of the metal member 1 having a base material composed of a copper alloy is prepared. For example, with a Corson copper alloy (Cu—Ni—Si alloy) having a plate thickness of 0.25 mm as the base material, a tin layer is provided as a predetermined white metal layer on an entire surface of the base material by plating. Further, a predetermined oil film is provided on an entire surface in the white metal layer to obtain a plate material 70 of the metal member.

Figure 2B:
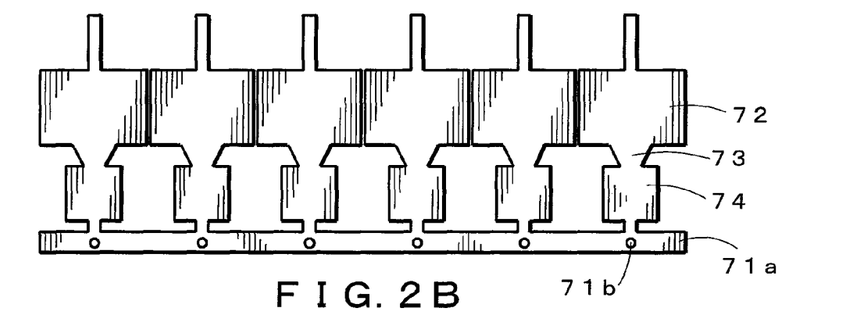

The plate material 70 is punched by a pressing process (primary press) into a repeated shape in such a manner that a plurality of terminals are in a spread-out state. With the present pressing process, a workpiece of a so-called cantilevered type in which each workpiece is supported at one end is fabricated, and a plate-like body for connector portion 72, a plate-like body for transition portion 73 and a plate-like body for tubular crimp portion 74 are formed integrally with a carrier portion 71a in which perforations 71b are formed at equal intervals (FIG. 2B). At this time, original plates of the respective terminals are punched in such a manner that they are arranged at a predetermined pitch along an X-direction and a longitudinal direction of the tubular crimp portion to be formed later is a Y-direction.

Figure 2C:
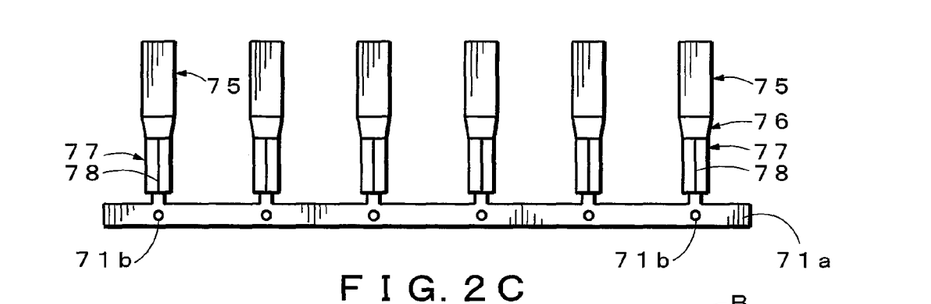

Then, the original plate of each terminal is subjected to a bending process (secondary press) to form a connector portion 75, a transition portion 76 and a tubular body for crimp portion 77 to be formed into a tubular crimp portion. At this time, a cross section which is perpendicular to the longitudinal direction of the tubular body for crimp portion 77 is substantially C-shaped with an extremely small gap. The end surfaces of the metal member across such a gap is referred to as a butted portion 78 (FIG. 2C). The butted portion 78 extends in the Y-direction. Further, at the end portion of the transition portion side of tubular body for crimp portion 77, a lapped portion (not shown) is provided in such a manner that an inner wall of the tubular body contacts in the Z-direction.

Figure 2D:
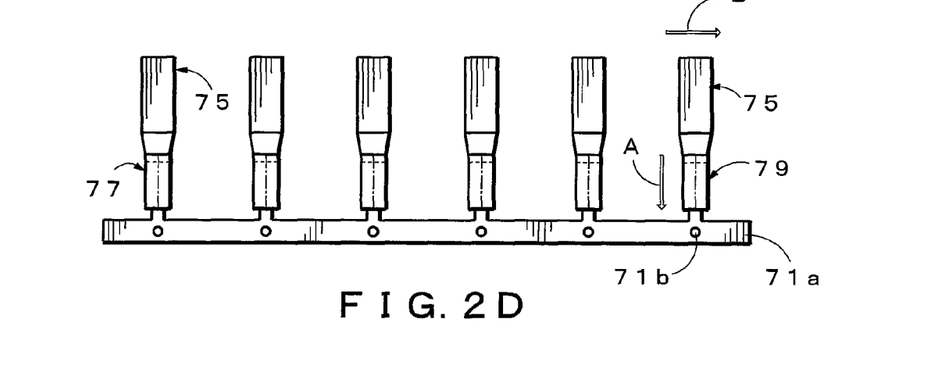

Thereafter, for example, a laser light is irradiated from above the tubular body for crimp portion 77 and swept in a direction of an arrow A in the figure along the butted portion 78 to apply laser welding to such a portion (FIG. 2D). Thereby, the butted portion 78 is welded. Further, an end portion on a transition portion 76 side of the tubular body for crimp portion 77 is welded and sealed by sweeping the lapped portion in a direction of an arrow B direction in the figure. With these weldings, the tubular crimp portion 79 that is a closed tubular body in which portions other than the insertion opening portion for the electric wire are closed is formed. Note that in any of the weldings, a weld portion (a belt-like weld portion which is also referred to as a weld bead) is formed as a welding trace. In the figure, a dash-dot line is the weld portion where the butted portion 78 is welded, and a broken line is the weld portion where the lapped portion is welded. As will be described below, it is preferable that the welding is performed using a fiber laser. The laser welding apparatus may be the one in which a focal position during welding can be adjusted three-dimensionally and is capable of three-dimensionally welding a reduced-diameter portion of the tubular body.

Figure 3:
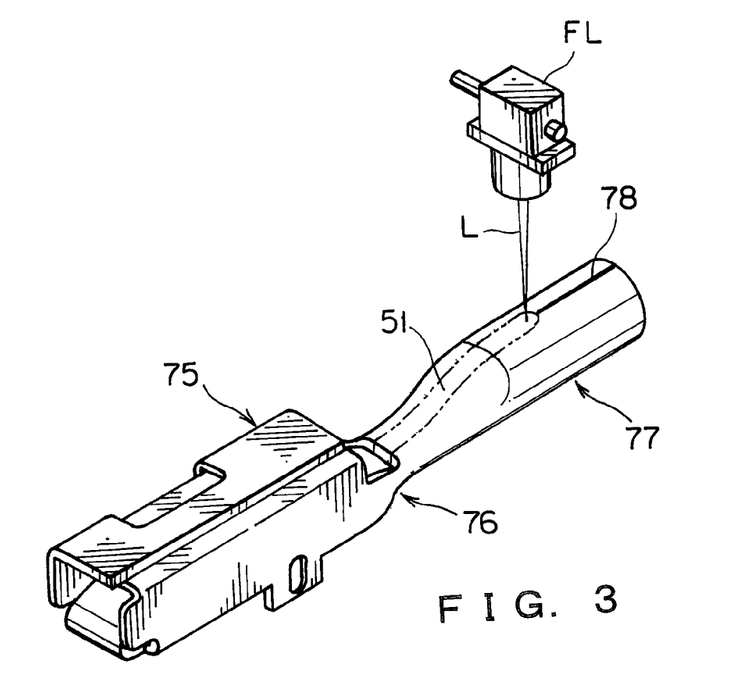
FIG. 3 is a perspective view showing a laser welding process of FIG. 2D.

FIG. 3 is a perspective view showing a laser welding process of FIG. 2D. As shown in FIG. 3, for example, a fiber laser welding apparatus FL emitting a laser light having an infrared wavelength of 1084 nm±5 nm is used, and the butted portion 78 of the tubular body for crimp portion 77 is welded at a laser power of 100 W to 2000 W, a sweep rate of 90 mm/sec to 250 mm/sec, and a spot diameter of approximately 20 μm. With the laser L being irradiated along the butted portion 78, the weld portion 51 is formed at substantially the same position as the butted portion 78. More specifically, with the laser light L emitted from the fiber laser welding apparatus FL being irradiated and energy of the laser light being converted into heat, at first, a part of the oil film on the butted portion 78 burns and transfers heat to melt the white metal layer, and subsequently melts the base material itself which constitutes the butted portion 78 by propagating the melting thermal energy. Thereafter, a weld portion 51 is provided by a rapid cooling. Note that the interval of the gap between the end surfaces of the butted portion 78 and the width of weld portion 51 do not necessarily match with each other.

Normally, since a copper alloy has a bad absorption efficiency for the laser light having the emission wavelength of a near infrared region, there may be a case where the welding width cannot be decreased and the width of the heat-affected zone (HAZ) cannot be narrowed. Also, due to laser welding, the copper alloy may have decreased mechanical characteristic at a weld portion and the vicinity thereof. The aforementioned problem is overcome by forming a predetermined white metal layer and an oil film on a part of the base material to be welded and by using laser light having a high energy density such as the fiber laser light.

Since the surface of the coating layer (e.g., the surface of tin, nickel, silver or alloys thereof) reflects less near infrared laser light than the copper alloy surface, the absorptivity of the near infrared laser light is good. For example, with the reflectometry of the near infrared by the spectrum photometry, the tin surface having a predetermined rough arithmetic mean roughness has a reflective index of around 60% to 80%, which is lower than the copper alloy surface having a reflective index of greater than or equal to 90%. In this manner, as the near infrared laser light is irradiated on a region where the coating layer having a high absorbency of the near infrared laser light is formed, the coating layer such as tin having a low melting point rapidly melts and forms a molten pool, and thereby the absorptivity of the laser light further increases. As the molten pool region absorbs laser light and melts the butted portion 78, the welding of the butted portion progresses.

Note that in a case where energy of the fiber laser light L is too high or in a case where an energy density is low, the heat-affected zone (HAZ) is formed in an unnecessarily wide range, and in an extreme case, an entirety of the base material of the tubular crimp portion 30 softens. Therefore, it is preferable that the fiber laser light L welds with a power of 100 W to 2000 W. Also, by adjusting the sweep rate, the weld portion 50 is provided in an appropriate range.

Also, after the welding that formed the tubular crimp portion, a lapped portion of the end portion on the transition portion 76 side of the tubular crimp portion (an end portion opposite to the electric wire insertion opening portion) is sealed by welding. The sealing is carried out in the direction perpendicular to the longitudinal direction of the terminal. The welding welds a portion where a metal member is folded and lapped from above the folded and lapped portion. With such a sealing, the end portion of the transition portion side of the tubular crimp portion is closed.

As has been described above, the method of manufacturing the terminal of the present disclosure includes punching a plate material of a metal member into a spread-out shape of a terminal, forming a terminal having a tubular body by pressing, welding a butted portion of the tubular body, and welding a lapped portion at an end portion opposite to an insertion opening portion of the tubular body to form a tubular crimp portion of a closed tubular body.

(Wire Connecting Structure)

Figure 4:
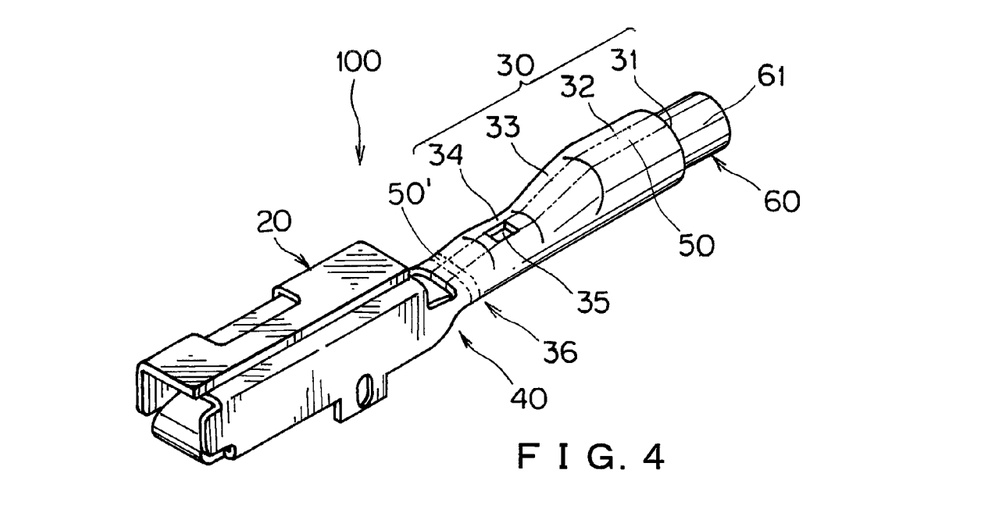
FIG. 4 is a perspective view showing an example of a wire connecting structure of the present disclosure.

FIG. 4 shows a wire connecting structure 100 of the present disclosure. The wire connecting structure 100 has a structure in which the terminal 10 of the present disclosure and an electric wire 60 are crimped and joined. In the wire connecting structure 100, the electric wire 60 is crimp connected in the tubular crimp portion 30 with the electric wire 60 (a part of the electric wire conductor portions and a part of the insulating coating portion) being inserted in the tubular crimp portion 30 and the tubular crimp portion 30 being crimped. Note that the electric wire 60 includes an insulating coating portion 61 and a conductor portion, not shown. The conductor portion is composed of copper, a copper alloy, aluminum or an aluminum alloy, or the like. As has been described above, recently, a conductor portion made of an aluminum alloy is becoming popular for the purpose of reducing weight. The insulating coating portion may be, for example, those based on polyolefin such as polyethylene (PE) and polypropylene (PP) or those based on polyvinyl chloride (PVC).

At the tubular crimp portion 30, by crimping the tubular crimp portion 30 with an electric wire end portion at which a conductor is exposed being inserted into the insertion opening portion 31, the coating crimp portion 32, the reduced-diameter portion 33 and the conductor crimp portion 34 deform plastically and crimped with a part of the insulating coating portion of the electric wire 60 and a part of the conductor portion, and the tubular crimp portion 30 and the conductor portion of the electric wire 60 are thereby electrically connected. A recessed portion 35 may be formed at a part of the conductor crimp portion 34 by pressing strongly. With such a strong pressing that causes a large deformation of the part, the conductor portion of the electric wire 60 does not need to keep an original strand shape.

A wire harness can be obtained by preparing one or a plurality of such a wire connecting structure 100 and arranging a connector portion/connector portions of the wire connecting structure/wire connecting structures 100 in a housing casing.

Figure 5:
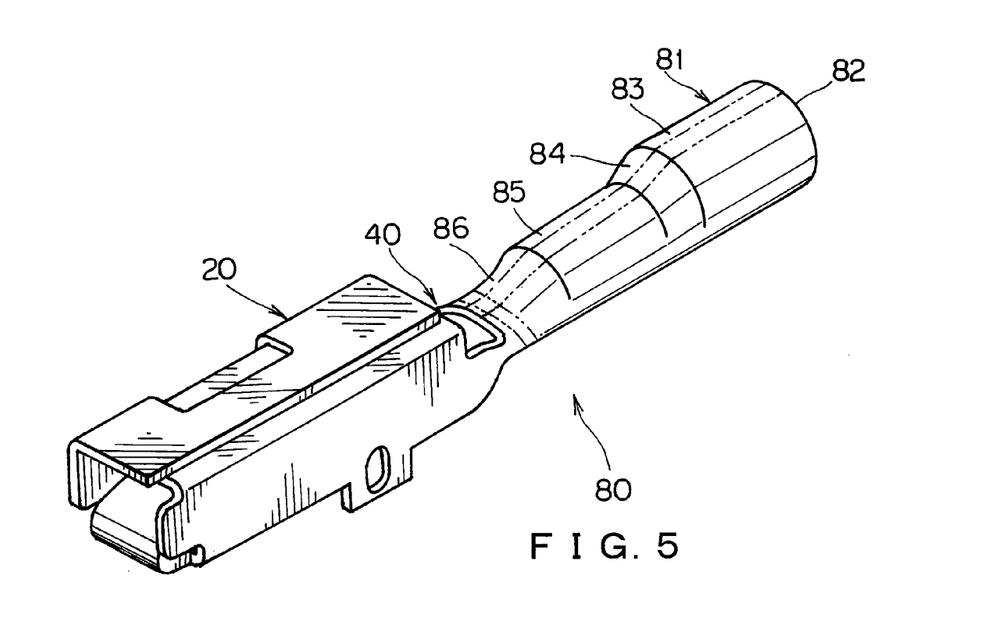
FIG. 5 is a perspective view showing a variant of the terminal of the present disclosure.

For example, FIG. 4 shows a state where the terminal 10 is crimped with the electric wire 60. However, as shown in FIG. 5, before being crimped with an electric wire, a terminal 80 may have a stepped configuration in the tubular crimp portion. Specifically, a tubular crimp portion 81 is a tubular member that is closed at a transition portion 40 side and that may include a coating crimp portion 83 that is crimped with an insulation coating of an electric wire, not shown, a reduced-diameter portion 84 having a diameter that reduces from an insertion opening portion 82 side to a transition portion 20 side, a conductor crimp portion 85 that is crimped with a conductor of electric wire 3, a reduced-diameter portion 86 having a diameter that further reduces from the insertion opening portion 82 side to the transition portion 40 side and an end portion closed by welding.

With such a tubular crimp portion 81 having a stepped shape, when the coating of the end portion of the electric wire is removed and the end portion is inserted into the tubular crimp portion 81, the insulation coating of the electric wire is engaged with the reduced-diameter portion 84, and thereby the insulation coating is located immediately under the coating crimp portion 83 and the electric wire is located immediately under the conductor crimp portion 85. Therefore, since the positioning of the electric wire end portion can be performed easily, crimping of the coating crimp portion 83 and the insulation coating and crimping of the conductor crimp portion 85 and the conductor can be performed positively. Thus both a good water-stop capability and an electric connection can be achieved and a good tight contact ability is achieved.

Figure 6:
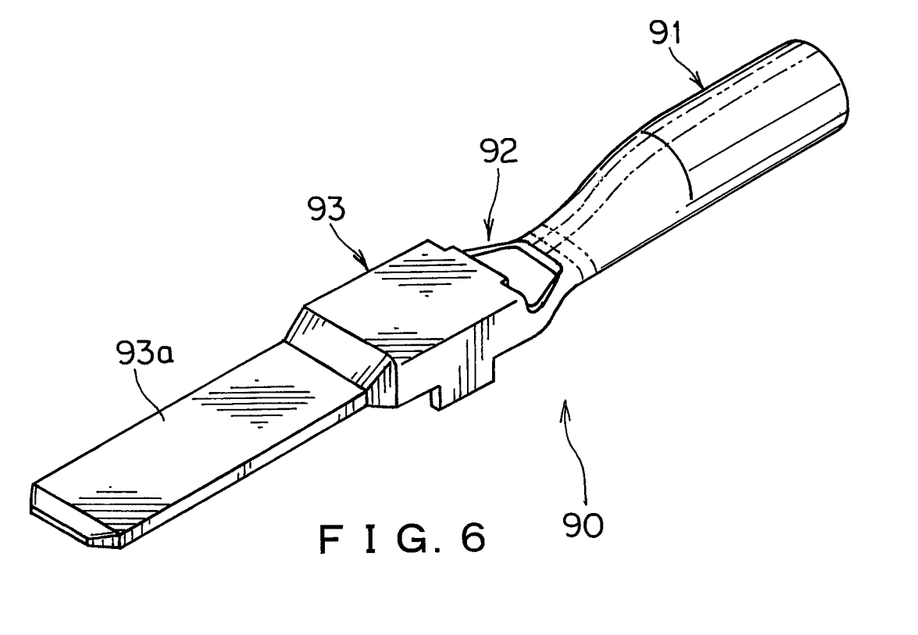
FIG. 6 is a perspective view showing another variant of the terminal of the present disclosure.

The terminal shown in FIG. 1 is a female terminal having a box-shaped connector portion 20, but it is not limited thereto and the connector portion may be a male terminal. Specifically, it may be a terminal 90 shown in FIG. 6 and may be provided with a tubular crimp portion 91 crimped with an electric wire, not shown, and a connector portion 93 provided integrally with the tubular crimp portion via a transition portion 92 and electrically connected to an external terminal, not shown. The connector portion 93 has an elongated connecting portion 93a and, with the connecting portion being inserted along a longitudinal direction of the female terminal, not shown, which is an external terminal, it is electrically connected with the female terminal.

EXAMPLES

Examples 1 to 40

In examples 1 to 40, copper alloys, shown in Tables 1-1 and 1-2, having a rectangular shape and a thickness of 0.2 mm to 0.4 mm were used as base materials and plating for providing a tin coating layer on a base material was performed. Note that, in examples provided with an under layer, plating for providing a coating layer was performed after having provided the nickel under layer by plating. Thereafter, a metal member was butted and penetration welded by a fiber laser for a welding time showing in Tables 1-1 and 1-2 for 1 cm to provide a test piece and cross-sectional observation and weldability evaluation were performed. Then, this test piece was subject to a bending process and crack measurement of the weld portion was performed.

<Copper Alloy Base Material>

Copper alloys FAS-680 and FAS-820 manufactured by Furukawa Electric Co., Ltd., and copper alloys MAX375 and MAX251 manufactured by Mitsubishi Shindoh Co., Ltd., were used as the base material. All of the copper alloys are materials containing Ni, Si, Sn or the like as additives.

The plating of the coating layer and the ground layer were performed under conditions described below.

<Coating Layer Plating Condition>

Plating solution: $SnSO_4$ 80 g/l, $H_2SO_4$ 80 g/l

Plating condition: current density 5 $A/dm^2$ to 10 $A/dm^2$, temperature 30° C.

Processing time: After setting the current density, adjusted to obtain a desired thickness of coating layer.

<Under Layer Plating Condition>

Plating solution: $Ni(SO_3NH_2)_2.4H_2O$ 500 g/l, $NiCl_2$ 30 g/l, $H_3BO_3$ 30 g/l Plating Condition: current density 20 $A/dm^2$ to 30 $A/dm^2$, temperature 50° C.

Processing time: After setting the current density, adjusted to obtain a desired thickness of under layer.

Within the aforementioned conditions, ten samples that are within ±10% of a desired thickness for each thickness level were made. Note that the thickness of the plating layer is measured with a fluorescent X-rays film thickness meter by measuring an average thickness of the layer on the end portion.

<Fiber Laser Welding Condition>

Laser Welding Apparatus (1): Fiber Laser Apparatus manufactured by Furukawa Electric Co., Ltd., Maximum Power 500 W, CW Fiber Laser Laser Beam Power: 400 W Sweep distance: 9 mm (butted portion approx. 7 mm)

Laser Scanning Rate: 120 to 200 mm/sec

Laser light irradiation with all conditions focused

Laser Welding Apparatus (2): Fiber Laser Apparatus manufactured by Furukawa Electric Co., Ltd., Maximum Power 2 kW, CW Fiber Laser Laser Beam Power: 800 W Sweep distance: 9 mm (butted portion approx. 7 mm)

Laser Scanning Rate: 250 mm/sec

Laser light irradiation with all conditions focused

<Presence of X-Phase in Cross-Sectional Observation>

As for a part including the weld portion, after filling a resin, a transverse plane was exposed by polishing and element mapping was performed by SEM-EDX. At the weld portion, presence of a phase of tin, a tin alloy, nickel, a nickel alloy, silver or a silver alloy (referred to as an X-phase) having a size greater than 0.1 μm×0.1 μm (0.01 μm²) was observed, and evaluated with the following criterion.

◯: X-phase is present.

x: X-phase is absent.

<Weldability Evaluation>

Weldability was evaluated with the following criterion by taking blowholes as weld defects and imaging a photo with a transmission X-ray, and the number of blowholes in the weld portion was counted.

◯: less than or equal to 10

Δ: more than 10 and less than or equal to 30 x: more than 30 or welding not possible

<Weld Portion Crack Resistance Evaluation>

A bending process was applied on the weld portion and evaluated. The bending test was performed under the condition of R/t=1.2, where t is a thickness of the base material and R is a bend radius, and evaluated with the following criterion.

◯: no crack.

x: cracks exist.

Comparative Example 1

Welding was performed using FAS-680 as a copper alloy base material. It is similar to Example 14 except that the laser scanning rate in the welding was changed.

Comparative Example 2

It is similar to Example 14 except welding was performed by YAG laser welding and the power and the laser scanning rate in the welding were changed.

Comparative Example 3

It is similar to Example 14 except that the thickness of the base material and the laser scanning rate in the welding were changed.

Comparative Example 4

It is similar to Example 14 except that the thickness of the under layer was changed.

Comparative Example 5

It is similar to Example 14 except that the thickness of coating layer was changed.

Comparative Example 6

It is similar to Example 14 except that the thickness of base material as well as the output and the laser scanning rate in the welding were changed.
<YAG Laser Welding Condition>
Welding apparatus: YAG laser welding apparatus manufactured by Miyachi Technos Corporate, maximum power 600 W, pulsed wave
Laser Beam power: 550 W
Sweep Distance: 9 mm (butted portion approximately 7 mm)
Laser Scanning Rate: 30 mm/s

TABLE 1-1

| | SAMPLE | | | | | WELDING CONDITION |
|---|---|---|---|---|---|---|
| | TYPE OF BASE MATERIAL | BASE MATERIAL PLATE THICKNESS d1 (mm) | UNDER LAYER (μm) | COATING LAYER d2 (μm) | d2/d1 | LASER DEVICE |
| EXAMPLE 1 | FAS-680 | 0.20 | 0.0 | 0.3 | 0.0015 | 500 W |
| EXAMPLE 2 | | | | 0.5 | 0.0025 | FIBER LASER |
| EXAMPLE 3 | | | | 0.8 | 0.0040 | |
| EXAMPLE 4 | | | | 1.0 | 0.0050 | |
| EXAMPLE 5 | | | 0.1 | 0.3 | 0.0015 | |
| EXAMPLE 6 | | | | 0.5 | 0.0025 | |
| EXAMPLE 7 | | | | 0.8 | 0 0040 | |
| EXAMPLE 8 | | | | 1.0 | 0.0050 | |
| EXAMPLE 9 | | | 0.3 | 0.3 | 0.0015 | |
| EXAMPLE 10 | | | | 0.5 | 0.0025 | |
| EXAMPLE 11 | | | | 0.8 | 0.0040 | |
| EXAMPLE 12 | | | | 1.0 | 0.0050 | |
| EXAMPLE 13 | | 0.25 | 0.0 | 0.3 | 0.0012 | |
| EXAMPLE 14 | | | | 0.5 | 0.0020 | |
| EXAMPLE 15 | | | | 0.8 | 0.0032 | |
| EXAMPLE 16 | | | | 1.0 | 0.0040 | |
| EXAMPLE 17 | | | 0.1 | 0.3 | 0.0012 | |
| EXAMPLE 18 | | | | 0.5 | 0.0020 | |
| EXAMPLE 19 | | | | 0.8 | 0.0032 | |
| EXAMPLE 20 | | | | 1.0 | 0.0040 | |
| EXAMPLE 21 | | | 0.3 | 0.3 | 0.0012 | |
| EXAMPLE 22 | | | | 0.5 | 0.0020 | |
| EXAMPLE 23 | | | | 0.8 | 0.0032 | |
| EXAMPLE 24 | | | | 1.0 | 0.0040 | |

| | WELDING CONDITION | | EVALUATION AFTER WELDING | | |
|---|---|---|---|---|---|
| | POWER (W) | LASER SWEEP RATE (mm/s) | PRESENCE OF X-PHASE IN CROSS-SECTIONAL OBSERVATION | CRACK RESISTANCE | WELDABILITY |
| EXAMPLE 1 | 400 | 180 | ◯ | ◯ | ◯ |
| EXAMPLE 2 | | 180 | ◯ | ◯ | ◯ |
| EXAMPLE 3 | | 180 | ◯ | ◯ | ◯ |
| EXAMPLE 4 | | 180 | ◯ | ◯ | ◯ |
| EXAMPLE 5 | | 180 | ◯ | ◯ | ◯ |
| EXAMPLE 6 | | 180 | ◯ | ◯ | ◯ |
| EXAMPLE 7 | | 180 | ◯ | ◯ | ◯ |
| EXAMPLE 8 | | 180 | ◯ | ◯ | ◯ |
| EXAMPLE 9 | | 180 | ◯ | ◯ | ◯ |
| EXAMPLE 10 | | 180 | ◯ | ◯ | ◯ |
| EXAMPLE 11 | | 180 | ◯ | ◯ | ◯ |
| EXAMPLE 12 | | 180 | ◯ | ◯ | ◯ |
| EXAMPLE 13 | | 150 | ◯ | ◯ | ◯ |
| EXAMPLE 14 | | 150 | ◯ | ◯ | ◯ |
| EXAMPLE 15 | | 150 | ◯ | ◯ | ◯ |
| EXAMPLE 16 | | 150 | ◯ | ◯ | ◯ |
| EXAMPLE 17 | | 150 | ◯ | ◯ | ◯ |

TABLE 1-1-continued

| | | | | |
|---|---|---|---|---|
| EXAMPLE 18 | 150 | ○ | ○ | ○ |
| EXAMPLE 19 | 150 | ○ | ○ | ○ |
| EXAMPLE 20 | 150 | ○ | ○ | ○ |
| EXAMPLE 21 | 150 | ○ | ○ | ○ |
| EXAMPLE 22 | 150 | ○ | ○ | ○ |
| EXAMPLE 23 | 150 | ○ | ○ | ○ |
| EXAMPLE 24 | 150 | ○ | ○ | ○ |

TABLE 1-2

| | SAMPLE | | | | | WELDING CONDITION |
|---|---|---|---|---|---|---|
| | TYPE OF BASE MATERIAL | BASE MATERIAL PLATE THICKNESS $d_1$ (mm) | UNDER LAYER (μm) | COATING LAYER $d_2$ (μm) | $d_2/d_1$ | LASER DEVICE |
| EXAMPLE 25 | FAS-680 | 0.30 | 0.0 | 0.3 | 0.0010 | 500 W FIBER LASER |
| EXAMPLE 26 | | | | 0.5 | 0.0017 | |
| EXAMPLE 27 | | | | 0.8 | 0.0027 | |
| EXAMPLE 28 | | | | 1.0 | 0.0033 | |
| EXAMPLE 29 | | | 0.1 | 0.3 | 0.0010 | |
| EXAMPLE 30 | | | | 0.5 | 0.0017 | |
| EXAMPLE 31 | | | | 0.8 | 0.0027 | |
| EXAMPLE 32 | | | | 1.0 | 0.0033 | |
| EXAMPLE 33 | | | 0.3 | 0.3 | 0.0010 | |
| EXAMPLE 34 | | | | 0.5 | 0.0017 | |
| EXAMPLE 35 | | | | 0.8 | 0.0027 | |
| EXAMPLE 36 | | | | 1.0 | 0.0033 | |
| EXAMPLE 37 | FAS-820 | 0.25 | 0.0 | 0.5 | 0.0020 | |
| EXAMPLE 38 | | | 0.1 | 0.5 | 0.0020 | |
| EXAMPLE 39 | MAX375 | 0.30 | 0.0 | 1.0 | 0.0033 | |
| EXAMPLE 40 | MAX251 | 0.40 | 0.0 | 2.0 | 0.0050 | 2 kW FIBER LASER |
| COMPARATIVE EXAMPLE 1 | FAS-680 | 0.25 | 0.0 | 0.5 | 0.0020 | 500 W FIBER LASER |
| COMPARATIVE EXAMPLE 2 | | 0.25 | 0.0 | 0.5 | 0.0020 | YAG LASER |
| COMPARATIVE EXAMPLE 3 | | 1.50 | 0.0 | 0.5 | 0.0003 | 500 W |
| COMPARATIVE EXAMPLE 4 | | 0.25 | 1.5 | 0.5 | 0.0020 | FIBER LASER |
| COMPARATIVE EXAMPLE 5 | | 0.25 | 0.0 | 4.0 | 0.0160 | |
| COMPARATIVE EXAMPLE 6 | | 1.50 | 0.0 | 0.5 | 0.0003 | 2 kW FIBER LASER |

| | WELDING CONDITION | | EVALUATION AFTER WELDING | | |
|---|---|---|---|---|---|
| | POWER (W) | LASER SWEEP RATE (mm/s) | PRESENCE OF X-PHASE IN CROSS-SECTIONAL OBSERVATION | CRACK RESISTANCE | WELDABILITY |
| EXAMPLE 25 | 400 | 120 | ○ | ○ | ○ |
| EXAMPLE 26 | | 120 | ○ | ○ | ○ |
| EXAMPLE 27 | | 120 | ○ | ○ | ○ |
| EXAMPLE 28 | | 120 | ○ | ○ | ○ |
| EXAMPLE 29 | | 120 | ○ | ○ | ○ |
| EXAMPLE 30 | | 120 | ○ | ○ | ○ |
| EXAMPLE 31 | | 120 | ○ | ○ | ○ |
| EXAMPLE 32 | | 120 | ○ | ○ | ○ |
| EXAMPLE 33 | | 120 | ○ | ○ | ○ |
| EXAMPLE 34 | | 120 | ○ | ○ | ○ |
| EXAMPLE 35 | | 120 | ○ | ○ | ○ |
| EXAMPLE 36 | | 120 | ○ | ○ | ○ |
| EXAMPLE 37 | | 135 | ○ | ○ | ○ |
| EXAMPLE 38 | | 135 | ○ | ○ | ○ |
| EXAMPLE 39 | | 120 | ○ | ○ | ○ |
| EXAMPLE 40 | 800 | 250 | ○ | ○ | ○ |
| COMPARATIVE EXAMPLE 1 | 400 | 60 | X | X | Δ |
| COMPARATIVE EXAMPLE 2 | 550 | 30 | X | X | Δ |
| COMPARATIVE EXAMPLE 3 | 400 | 30 | PENETRATION WELDING NOT POSSIBLE | | |
| COMPARATIVE EXAMPLE 4 | 400 | 150 | ○ | X | Δ |
| COMPARATIVE EXAMPLE 5 | | 150 | ○ | X | X |
| COMPARATIVE EXAMPLE 6 | 800 | 60 | ○ | X | X |

Tables 1-1 and 1-2 show evaluation results. It can be seen from Tables 1-1 and 1-2 that Examples 1 to 40 all have improved crack resistance and weldability. On the other hand, Comparative Examples 1, 2 show results that an X-phase of a size greater than 0.01 µm² does not exist in cross-sectional observation, and thus had reduced crack resistance. Comparative Example 3 shows a result that the base material had a thickness of 1.50 mm and penetration welding cannot be performed and evaluation was not possible. Comparative Example 4 shows a result that the under layer had a thickness of 1.5 µm and had reduced crack resistance. Comparative Example 5 shows a result that the coating layer had a thickness of 4.0 µm, and had reduced crack resistance and weldability. Comparative Example 6 shows a result that the base material had a thickness of 1.50 mm, and had a reduced crack resistance and weldability. From the above, the terminal of the present disclosure has an improved crack resistance and weldability by having a tubular crimp portion composed of a metal member including a base material having a thickness of 0.20 mm to 1.40 mm, an under layer having a thickness of 0.0 µm to 0.8 µm and formed on the base material, and a coating layer having a thickness of 0.2 µm to 3.0 µm formed on the base material and/or the under layer, and having a weld portion formed by butt welding the metal member, and an X-phase greater than 0.01 µm² existing in the weld portion.

Note that the Examples are examples in which tin is used as the coating layer, but similar results can be obtained when nickel and silver are used as the coating layer, and a terminal having an improved crack resistance and weldability can be obtained.

Also, since these terminal have a tubular crimp portion sealed at a tip, moisture is less likely to attach to a contact point between the conductor section of terminal and the electric wire after crimping with the electric wire. Thus, corrosion at the contact point is difficult to develop and becomes a wire connecting structure having improved anti-corrosion property. This is significant when an aluminum alloy is used for the conductor portion of the electric wire.

The present disclosure has been described using an embodiment, but it goes without saying that the technical scope of the present disclosure is not limited to a scope described in the above embodiment. It is apparent to those skilled in the art that various modifications or improvements can be added to the embodiments described above. Also, it is apparent from the claims that embodiments with such modification or improvement being added can also be included in the technical scope of the present disclosure.

What is claimed is:

1. A terminal comprising:
a connector portion adapted to mate with another terminal;
a tubular crimp portion adapted to crimp and join with an electric wire; and
a transition portion joining the connector portion and the tubular crimp portion,
the tubular crimp portion being composed of a metal member including a base material and a coating layer formed on the base material,
the base material being composed of one of copper and a copper alloy and having a thickness in a range of 0.20 mm to 1.40 mm,
the coating layer being composed of one of tin, a tin alloy, nickel, a nickel alloy, silver and a silver alloy and having a thickness in a range of 0.2 µm to 3.0 µm,
the tubular crimp portion having a weld portion formed by butt welding the metal member,
the weld portion having, in a cross section of the weld portion perpendicular to a longitudinal direction of the terminal, a phase existing therein of one of tin, a tin alloy, nickel, a nickel alloy, silver and a silver alloy, the phase being of a size greater than 0.01 µm²,
the tubular crimp portion being formed into a closed tubular body in which one end opposite to an electric wire insertion opening is closed.

2. The terminal according to claim 1, further comprising an under layer between the base material and the coating layer, the under layer being on a part or an entirety of a surface of the base material, the under layer being composed of one of nickel, a nickel alloy, cobalt and a cobalt alloy and having a thickness in a range of 0.1 µm to 0.8 µm.

3. The terminal according to claim 1, wherein a ratio of an average value d1 of a thickness of the coating layer to an average value d2 of a thickness of the base material in the tubular crimp portion is in a range of 0.001 to 0.005.

4. The terminal according to claim 1, wherein the weld portion is formed by a fiber laser.

5. A wire connecting structure comprising the terminal according to claim 1 and a coated electric wire, the coated electric wire being adapted to be crimped and joined to the terminal.

6. The wire connecting structure according to claim 5, wherein the coated electric wire comprises a conductor portion composed of one of an aluminum and an aluminum alloy.

7. A method of manufacturing a terminal, comprising:
punching a plate material to form a cut-out member, the plate material being composed of a metal member including a base material and a coating layer formed on the base material, the base material being composed of one of copper and a copper alloy and having a thickness in a range of 0.2 mm to 0.7 mm, the coating layer being composed of one of tin, a tin alloy, nickel, a nickel alloy, silver and a silver alloy and having a thickness in a range of 0.2 µm to 3.0 µm;
performing a pressing process on the cut-out member to form a tubular body;
welding a butted portion of the tubular body; and
forming a closed end portion by welding a lapped portion of the tubular body at an end opposite to an insertion opening portion of the tubular body.

8. The method of manufacturing the terminal according to claim 7, wherein the terminal comprises an under layer between the base material and the coating layer, the under layer being on a part or an entirety of a surface of the base material, the under layer being composed of one of nickel, a nickel alloy, cobalt and a cobalt alloy and having a thickness in a range of 0.1 µm to 0.8 µm.

* * * * *